United States Patent
Freudelsperger

(10) Patent No.: US 8,682,480 B2
(45) Date of Patent: Mar. 25, 2014

(54) DEVICE AND PROCESS FOR RECOGNIZING AND GUIDING INDIVIDUALLY PACKAGED PRODUCTS WITH A CODE

(75) Inventor: Karl Freudelsperger, Hart bei Graz (AT)

(73) Assignee: Knapp AG, Hart bei Graz (AT)

( * ) Notice: Subject to any disclaimer, the term of this patent is extended or adjusted under 35 U.S.C. 154(b) by 224 days.

(21) Appl. No.: 13/254,486

(22) PCT Filed: Feb. 18, 2010

(86) PCT No.: PCT/EP2010/001014
§ 371 (c)(1),
(2), (4) Date: Sep. 2, 2011

(87) PCT Pub. No.: WO2010/099873
PCT Pub. Date: Sep. 10, 2010

(65) Prior Publication Data
US 2011/0320036 A1    Dec. 29, 2011

(30) Foreign Application Priority Data
Mar. 2, 2009 (DE) .......... 10 2009 011 229

(51) Int. Cl.
*G06F 7/00* (2006.01)
*B65G 43/08* (2006.01)

(52) U.S. Cl.
USPC ........... 700/226; 700/224; 700/225; 700/223; 700/228; 700/230; 198/358

(58) Field of Classification Search
None
See application file for complete search history.

(56) References Cited

U.S. PATENT DOCUMENTS

| 3,252,595 | A | 5/1966 | Collins et al. |
| 4,819,783 | A | 4/1989 | Pinyan et al. |
| 6,085,914 | A | 7/2000 | Tobaccowala et al. |

FOREIGN PATENT DOCUMENTS

| DE | 9106292 U1 | 7/1991 |
| DE | 4225041 A1 | 2/1994 |
| DE | 10209864 A1 | 9/2003 |
| DE | 102006035050 A1 | 1/2008 |
| EP | 0310411 A1 | 4/1989 |
| GB | 1445100 A | 8/1976 |
| WO | 9201272 A1 | 1/1992 |
| WO | WO 9201272 A1 * | 1/1992 |
| WO | 9847790 A1 | 10/1998 |
| WO | 03074201 A1 | 9/2003 |
| WO | WO 03074201 A1 * | 9/2003 |

* cited by examiner

Primary Examiner — Yolanda Jones
(74) Attorney, Agent, or Firm — McGlew and Tuttle, P.C.

(57) ABSTRACT

An arrangement (1) and to a method is for detecting and controlling piece goods (2), having a code, in a commissioning system. The piece goods are fed on a conveyor line (3) through a scanning device (15), and are identified as actual data and are compared or captured to target data of the piece goods quantity stored in a central computer. The piece goods are separated out if the target data do not match the actual data. The invention proposes that a plurality of ejection devices (13) are provided. Each of the ejection devices (13) fills a positioned order container (25) of a particular commissioning order with piece goods, and piece goods that are not detected or sorted out are discharged to the longitudinal end of the conveyor line (3). The piece goods of various commissioning orders are randomly distributed on the central belt (27) of an automated commissioning machine and fed to the arrangement (1).

16 Claims, 7 Drawing Sheets

Fig. 7
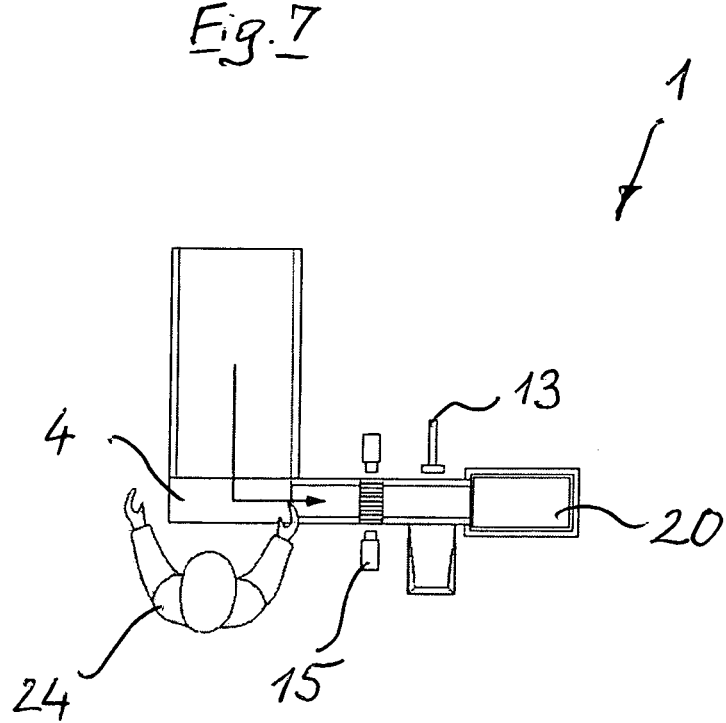
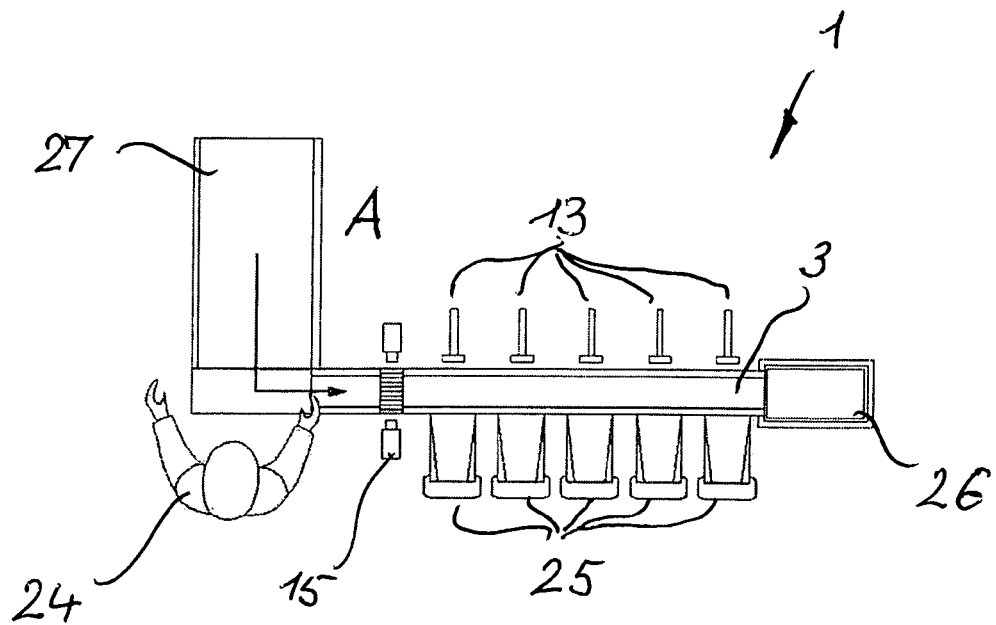
Fig. 8

DEVICE AND PROCESS FOR RECOGNIZING AND GUIDING INDIVIDUALLY PACKAGED PRODUCTS WITH A CODE

CROSS REFERENCE TO RELATED APPLICATIONS

This application is a United States National Phase application of International Application PCT/EP2010/001014 and claims the benefit of priority under 35 U.S.C. §119 of German Patent Application DE10 2009 011 229.4 filed Mar. 2, 2009, the entire contents of which are incorporated herein by reference.

FIELD OF THE INVENTION

The present invention pertains to a device and a process for recognizing and guiding individually packaged products provided with a code, whereby the individually packaged products are guided separated and centered on a conveying track that has a V-shaped cross section, through a scanning device with a plurality of individual scanners and are identified in the scanning device by reading the code of the individually packaged product as actual data and are then compared or detected with the desired data, stored in a central computer, of the individually packaged product quantity, and if there is disagreement of the desired data with the actual data, the individually packaged product is separated out.

BACKGROUND OF THE INVENTION

According to the state of the art, different individually packaged products are stored in a warehouse in bays at a certain location, sorted by kinds. When placing a commissioning order of a customer, the desired goods or individually packaged products are removed manually by an operator or, for example, at a wholesale dealer, automatically in a commissioning unit from the destination site in the warehouse and fed to a transport container, for example, a tub. The tub preferably contains the products of a complete commissioning order, is guided to a shipping area and from there is finally transported to the customer.

The difficulty lies in guaranteeing that the correct products were assigned to each commissioning order. In order to guarantee this, each order must be checked.

One possibility of checking is, for example, weighing an empty and a filled container in case of a commissioning order and calculating the total weight of the filled container from the known individual weights of the individually packaged products besides the known empty weight of the container. However, many different individually packaged products often have approximately the same weight, so that the weighing method is only conditionally reliable. If there is no difference, in weighing, between the set weight and the actual weight of a commissioning order, then the correct composition of a desired commissioning order cannot hence be absolutely concluded. If there is a difference between the set weight and the actual weight, then the error is unknown for the most part and can often be eliminated only with difficulty by all individual products of the container having to be taken once more from the container and checked manually in order to determine definitively which product is missing or if too much is present. This means not only a tremendous expenditure of time, but also a high cost factor, which is reflected, if nothing else, in the price of the product.

To lower costs and expense, according to the state of the art, the products or individually packaged products are provided with a bar code beforehand, i.e., still before storing the individually packaged products in the warehouse. The thus identified individually packaged products are taken from the container for checking and fed manually to a reading device or a hand scanner, which is capable of identifying the product by the bar code. It is understood that such an identification process is nevertheless expensive.

In order to recognize a large number of individually packaged products comparatively quickly for the purpose of optionally introducing corrective measures, the "check station" mentioned in the introduction, whose conveying track, which has a V-shaped cross section, is a diagonal chute, on which the individually packaged products, fed manually separately, slide through a scanning tunnel because of their gravity and are hereby read and checked and are possibly subsequently sorted out, is known from DE 102 09 864 A1. However, it was shown that the sliding speed is undefined and limited, and a reliable centering in the V angle of the chute and reliable multidimensional scanning in case of high throughput of individually packaged products are only conditionally possible.

SUMMARY OF THE INVENTION

An object of the present invention is to provide a device and a process of the type mentioned in the introduction, which is capable of recognizing and sorting a large number of individually packaged products using simple means in case of rapid throughput of individually packaged products and, nevertheless, high reliability of a three-dimensional scanning.

The essence of the device for recognizing and guiding individually packaged products provided with a code according to the present invention, of individually packaged products commissioned in a commissioning unit, is to provide a plurality of selecting means in the area of the longitudinal end of the conveying track, whereby each of the selecting means fills a positioned order container of a certain commissioning order with individually packaged products of the certain commissioning order, and individually packaged products which are not recognized or are to be sorted out are delivered into a container at the longitudinal end of the conveyor track. The individually packaged products of various commissioning orders are fed to the device, chaotically distributed on the central belt of an automatic commissioning unit.

Preferably, the conveying track, which has a V-shaped cross section, is especially designed for a fast, reliable scanning of the individually packaged products. The one V leg of the conveying track is a driven individually packaged product-conveying element, and preferably a driven circular conveying belt, on which the conveyed individually packaged product lies in a nonsliding manner, while the other V leg of the conveying track is a stationary individually packaged product-sliding element, preferably a sliding plate, on which the conveyed individually packaged product slides.

In each selecting means, a buffer with a flap that can be opened on the bottom for a guided delivery of buffered, recognized individually packaged products into a positioned container may be provided at the lateral delivery point, as also especially a buffer with a flap that can be opened on the bottom for a guided delivery of buffered, non-recognized individually packaged products into a container kept ready can be provided at the longitudinal end of the first conveying track.

The selecting means, which can be controlled by means of the central computer, has at least one transverse pusher, at least one diverter or at least one pivoting flap, which releases an ejection opening.

The first conveying track here preferably runs in the horizontal direction, whereby the two V legs form an angle of at least 90°, preferably form exactly a right angle, and at least one of the V legs, preferably both V legs form an angle of 45° to the horizontal.

In particular, the first conveying track, in the longitudinal direction, is composed of two (first and second) conveying sections aligned with one another, each consisting of an individually packaged product-conveying element and of an individually packaged product-sliding element, whereby the individually packaged product-sliding element of the second conveying section is connected, aligned, to the individually packaged product-conveying element of the first conveying section, and inversely, the individually packaged product-conveying element of the second conveying section is connected, aligned, to the individually packaged product-sliding element of the first conveying section.

The individually packaged product-sliding element may be designed as light-transparent to be able to scan the sliding underside of a conveyed individually packaged product as well. Provisions are, however, preferably made for a stationary light-transparent section, especially a glass window, to be arranged directly downstream aligned with the non-light-transparent individually packaged product-sliding element, whereby the length of the individually packaged product-conveying element corresponds approximately to the sum of the individual lengths of the individually packaged product-sliding element and of the light-transparent section.

In the area of the light-transparent section, and especially of the glass window, a three-dimensional scanning device with preferably three individual scanners is provided, whose first individual scanner reads the possible code on the sliding surface of a conveyed individually packaged product through the light-transparent section, and whose other individual scanners read possible codes of other side surfaces of the conveyed individually packaged product, but it [first individual scanner] does not read the side surface of the individually packaged product that lies on the individually packaged product-conveying element in a nonsliding manner.

An especially effectively working device with high throughput capacity of individually packaged products provides for each of the two conveying sections to have a (first or second) scanning device each with preferably three individual scanners as well as a (first or second) light-transparent section, especially a (first or second) glass window, whereby an individual scanner of the second conveying section reads a possible code of the up to now unread side surface of the individually packaged product that was lying beforehand in a nonsliding manner on the individually packaged product-conveying element of the first conveying section through the associated second light-transparent section. During operation, the first belt thus pulls an individually packaged product over the first glass window. Here, the first unknown side is canned. After that, the (second) belt changes to the other side in order to be able to draw the second unknown side over the second glass window.

In particular, a process for recognizing and guiding individually packaged products provided with a code according to the present invention is characterized in that individually packaged products of a plurality of commissioning orders are preferably simultaneously delivered in chaotic distribution onto a central belt of an automatic commissioning unit of the commissioning unit and are conveyed via the central belt and optionally joining conveyor belts to a distribution station, and especially a shipping station, and in that the individually packaged products are preferably fed by an operator in the distribution station in pairs and spaced apart from one another simultaneously to the inlet of the first conveying track.

Two operators may optionally operate a single central belt in the distribution station by means of two parallel devices with central positioning of identical order containers.

An order container filled with individually packaged products of a complete commissioning order may preferably be fed or transported to a loading station or a parking station.

A recognition report about a correct commissioning order as well as a report about an error in commissioning may optionally be prepared.

If the distance of two simultaneously fed individually packaged products selected by the operator is too small to make possible a reliable scanning of two individually packaged products spaced apart from one another at the adjusted, usually high, conveying speed of the first conveying track in the range of one m/sec and a reliable discharging at the selecting means, a distance recognition means, and especially a distance light barrier, provides an automatic turning off of the drive of the first conveying track or of the drive of the individually packaged product-conveying element of the first conveying track. The operator may then place the individually packaged products, which are spaced too close to one another, with new greater distance again onto the conveying track and restart the drive by pressing a button at a terminal.

It is desirable to keep the distance between the individually packaged products to be scanned as low as possible, and especially in the range of 200 mm. Due to the possible low individually packaged product distance, two individually packaged products can be read in two scanning devices spaced apart from one another, which is desirable for achieving a high throughput rate. By means of fixed cycle tracking combined with the identification of the cameras or scanners and the measurement of the individually packaged product length by means of the distance light barrier, one knows which code belongs to which individually packaged product or which individually packaged product does not have a code.

According to the present invention, consequently only one side of the "V belt" is a driven belt in the first conveying track. The other side is a fixed sliding plate. The individually packaged products are automatically aligned in the V angle only by this combination, and only this alignment enables the scanners or cameras to detect an optimal image. If both sides of the "V belt" were driven, the alignment would not be reliable, especially not at the high conveying speed according to the present invention, preferably in the range of one m/sec. It depends on the "relative speed" between the two sides of the "V belt," which makes possible a local rotation of a fed individually packaged product until the individually packaged product has found its stable position in the V angle. It would hence also be theoretically conceivable to use another driven circular belt with a different speed instead of the fixed sliding plate; however, in practice it is impractical because of the greater expense.

Therefore, according to the present invention, a device is suggested that can be operated with high throughput rate with high reliability because of the highly defined, adjustable conveying speed of the first conveying track (by contrast to a prior-art "chute" of the state of the art mentioned in the introduction) and because of the low minimum distance between two individually packaged products to be scanned, especially if two scanning devices spaced apart from one another are each provided with three individual scanners.

In a special embodiment, the device is located alone or together with another device of the identical type, i.e., connected to a central belt of an automatic commissioning unit that preferably processes a plurality of commissioning orders simultaneously with great effectiveness and ejects commissioned individually packaged products chaotically distributed onto the central belt. The unsorted or chaotically distributed individually packaged products are then fed up to a distribution station, and especially to a shipping station, and are only there separated in the device according to the present invention and compiled into commissioning orders in order containers kept ready there by means of the central computer of the commissioning unit and suitable software, which guides the selecting means of the device accordingly. Besides the great effectiveness of the "chaotic commissioning" and besides the reliability of the sorting and fast compiling of the commissioning orders only at the "target location" of the shipping station, it is especially advantageous of the present invention that order containers for the compiling of the individual commissioning orders, as according to the state of the art, are not needed in the area of the automatic commissioning unit. Thus, the logistical problem of the empty container transport to the automatic commissioning unit is omitted in the present invention. The empty containers only have to be transported up to the shipping station or distribution station to be used there as order containers for commissioning orders. Consequently, the containers cover short paths, for example, from truck to distribution station, which is practically operated as a "commissioning station."

In case of corresponding structural expense, the system can be fully automated and the above-mentioned operator(s) can be dispensed with.

The device according to the present invention and the process according to the present invention are explained in detail below based on exemplary embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 7 is a schematic top diagram view of the device; and

FIG. 8 is a schematic top diagram view similar to FIG. 7 of the device according to the present invention.

DESCRIPTION OF THE PREFERRED EMBODIMENTS

Figure 1:
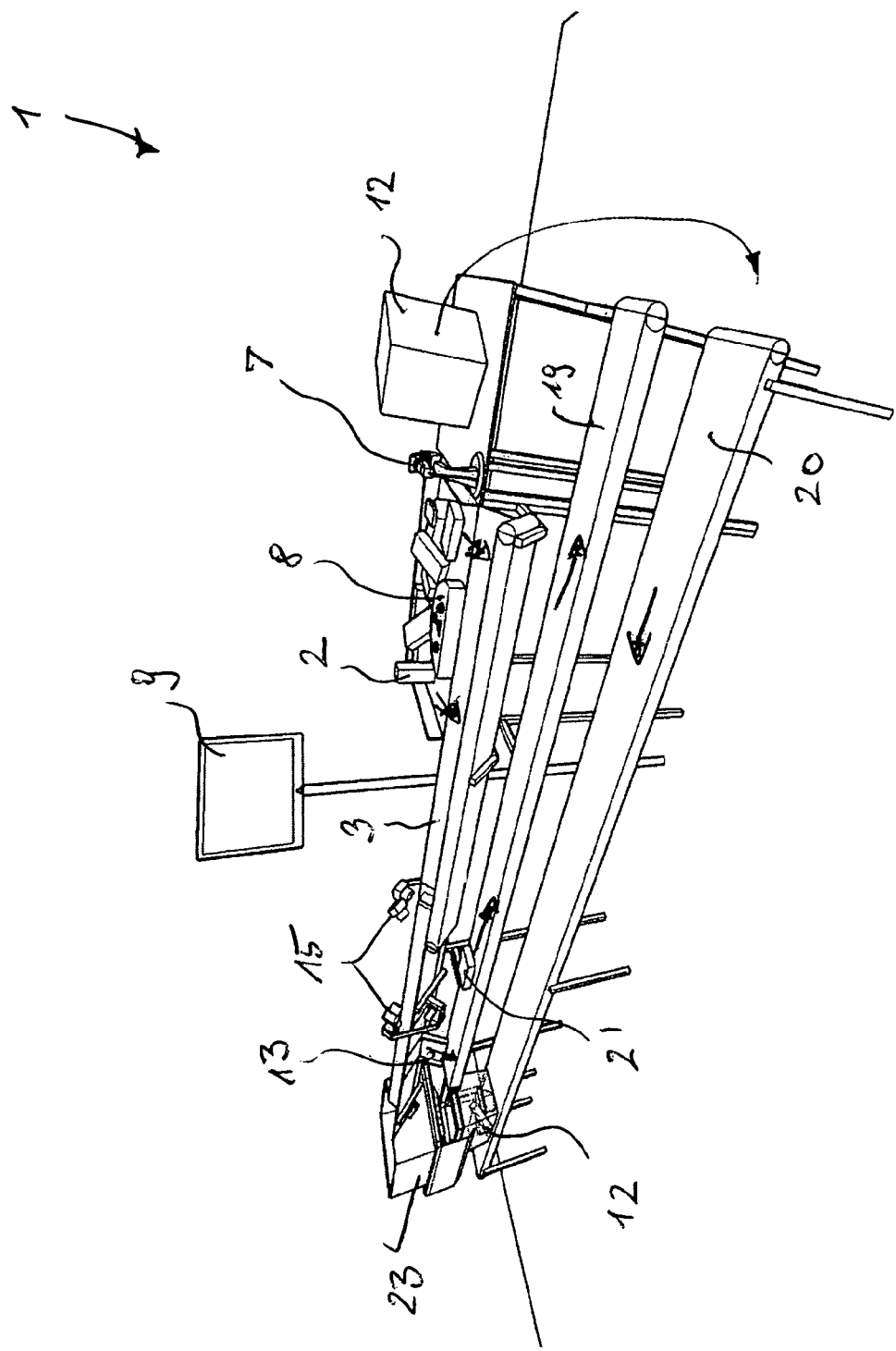
FIG. 1 is a schematic perspective lateral view showing a device containing the core of the present invention for recognizing and guiding individually packaged products provided with a code.
Figure 2:
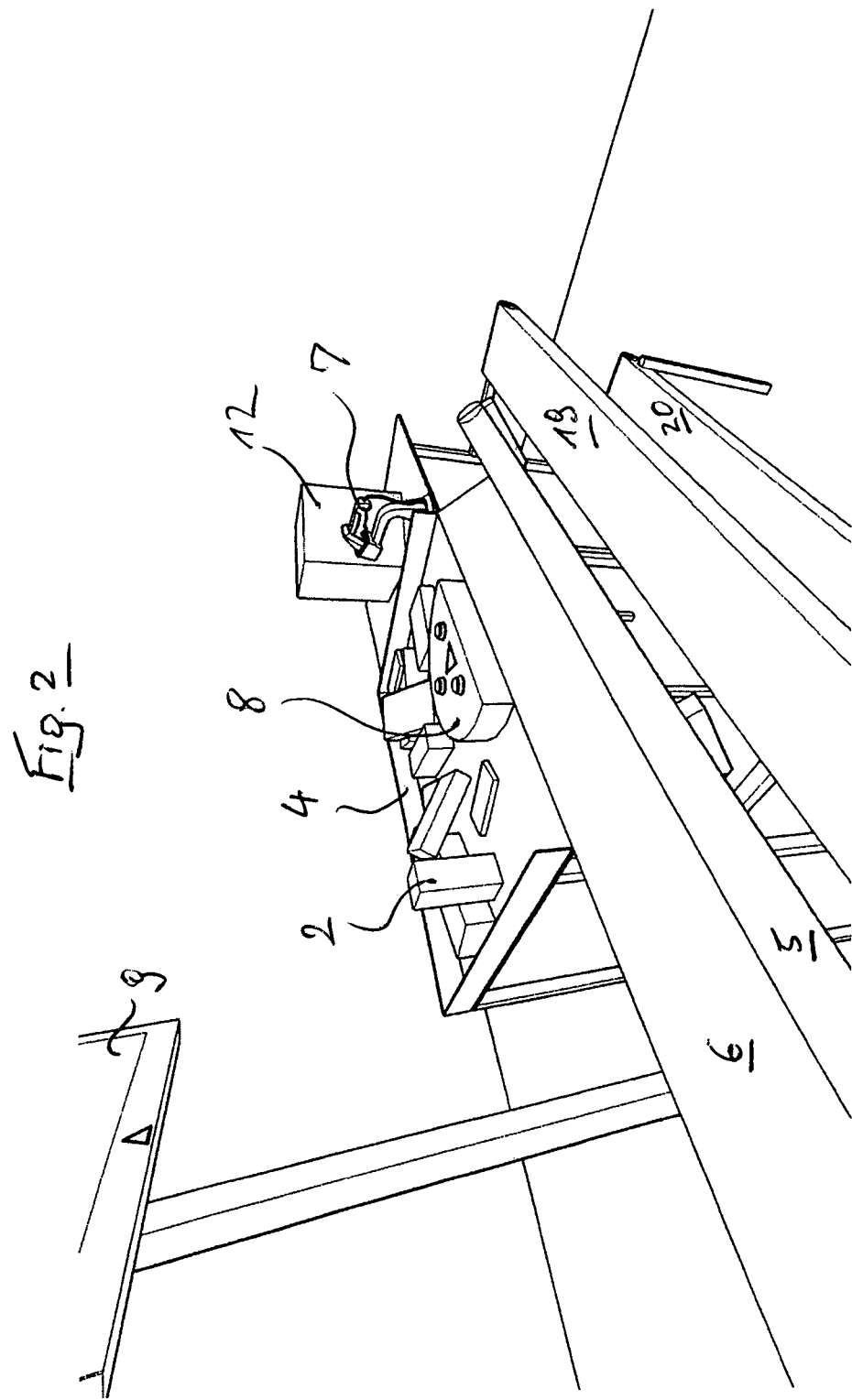
FIG. 2 is a schematic perspective view showing the detail of the inlet area of the device according to FIG. 1, with working surface, terminal, as well as first, second and third conveying tracks, especially the workstation of an operator.
Figure 3:
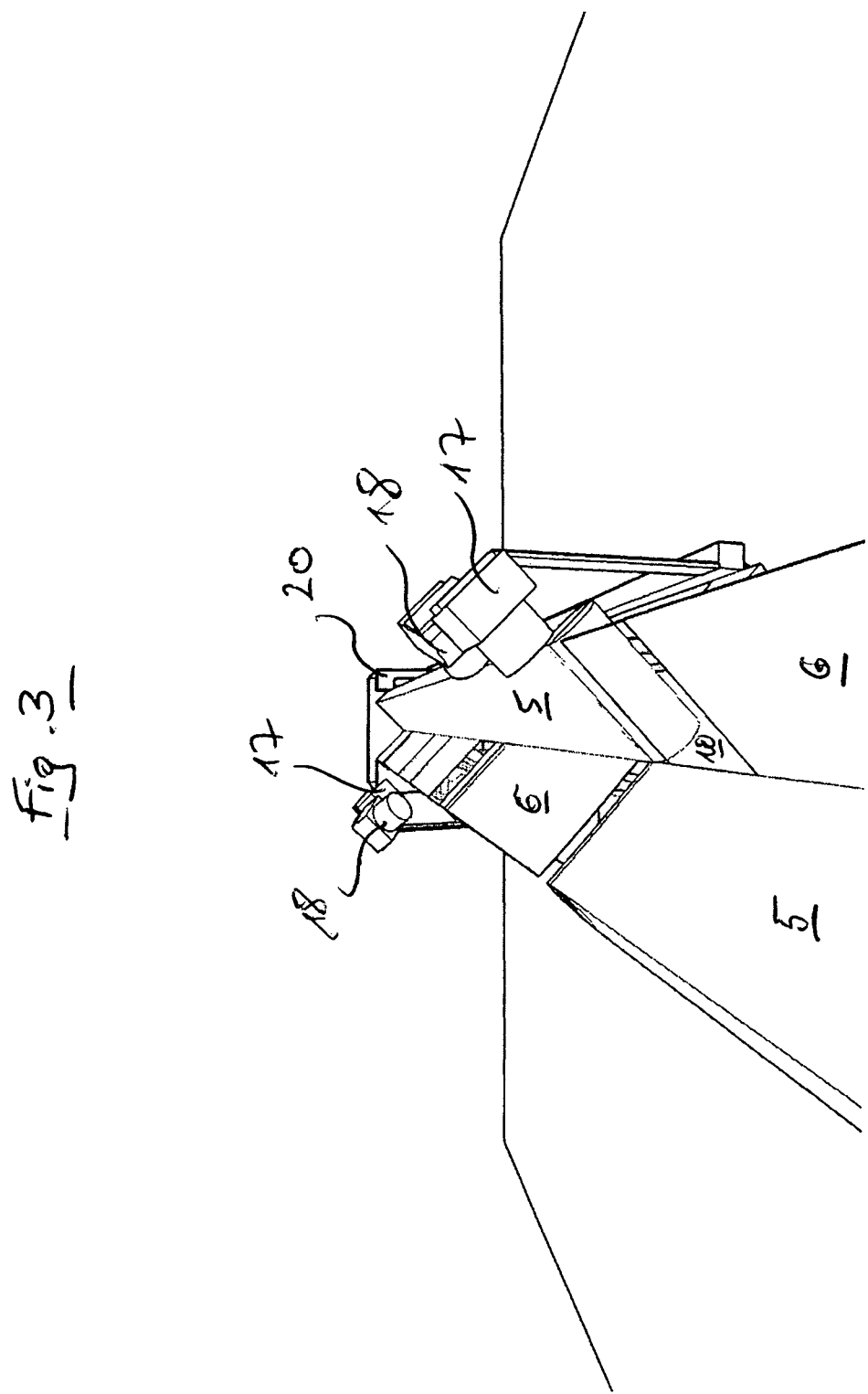
FIG. 3 is a front view showing the first conveying track consisting of two conveying sections in addition to individual scanners.
Figure 4:
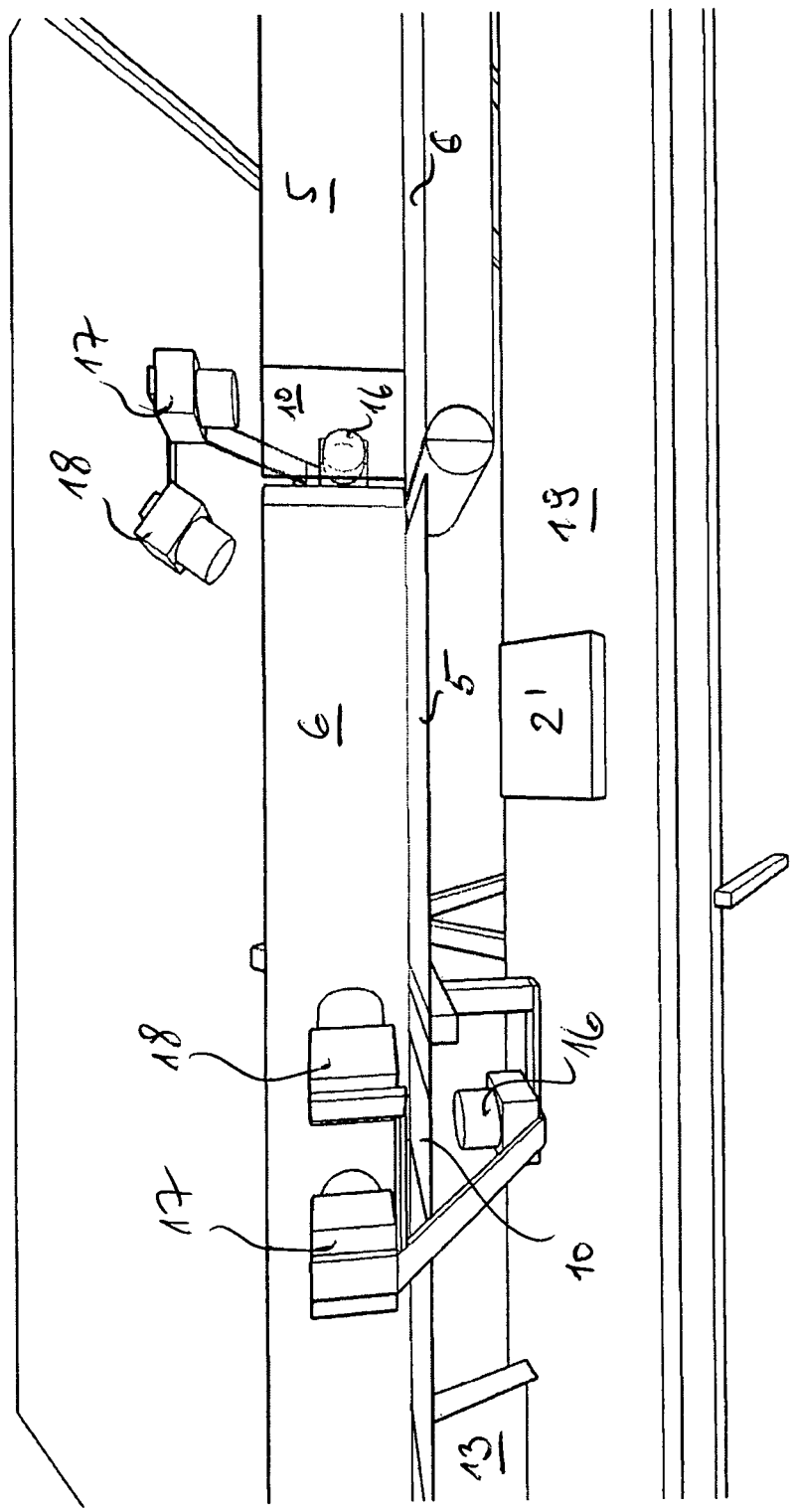
FIG. 4 is a schematic top view of the device according to FIG. 1 in the area of the individual scanner.

Referring to the drawings in particular, the present invention is described based on the device 1 for recognizing and guiding individually packaged products provided with codes containing the core of the present invention, shown in FIGS. 1 through 7. The device 1 is part of a commissioning unit, in which individually packaged products—unlike in the present invention—are commissioned in a manner not of detailed interest here. Unlike in the present invention, the commissioned individually packaged products of a single commissioning order are checked and collected in a single (order) container 12, and individually packaged products not belonging to the order are sorted out.

The codes are data matrix codes, in which the following data contents are coded: product identification, batch information, expiration date, serial number.

The commissioning unit has a central computer (not shown), to which the device described below is connected via a terminal.

The device 1 for recognizing and guiding a quantity of individually packaged products 2 provided with a code has a first conveying track 3 that has a V-shaped cross section, whereby the individually packaged products of a commissioning order are guided separated and centered on a conveying track as they pass through a scanning device 15 with a plurality of individual scanners 16, 17, 18 and are identified as actual data in the scanning device 15 by reading the code of the individually packaged product 2 and are compared with the desired data, stored in the central computer, of the individual packaged product quantity, and if there is disagreement of the desired data with the actual data, the individually packaged product is separated out.

In particular, the one V leg of the first conveying track 3, which has a V-shaped cross section, is a driven individually packaged product-conveying element 5, especially a driven circular conveyor belt, on which the conveyed individually packaged product 2 lies in a nonsliding manner.

The other V leg of the first conveying track 3 is a stationary individually packaged product-sliding element 6, especially a sliding plate, on which the conveyed individually packaged product 2 slides, on the other hand.

The first conveying track 3 is arranged horizontally.

The two V legs form an angle of at least 90° and they form exactly a right angle in the exemplary embodiment of the drawings.

At least one of the V legs forms an angle of 45° to the horizontal, and both V legs in the exemplary embodiment of the drawings.

In particular, in the longitudinal direction, the first conveying track 3 is composed of two (first and second) conveying sections aligned with one another, each consisting of an individually packaged product-conveying element 5 and an individually packaged product-sliding element 6, whereby the individually packaged product-sliding element 6 of the second conveying section is connected, aligned, to the individually packaged product-conveying element 5 of the first conveying section, and inversely, the individually packaged product-conveying element 5 of the second conveying section is connected, aligned, to the individually packaged product-sliding element 6 of the first conveying section.

A stationary light-transparent section 10, and especially a glass window, is arranged directly downstream aligned with the non-light-transparent individually packaged product-sliding element 6, whereby the length of the individually packaged product-conveying element 5 corresponds approximately to the sum of the individual lengths of the individually packaged product-sliding element 6 and of the light-transparent section 10.

In the area of the light-transparent section 10 or of the glass window, a three-dimensional scanning device 15 with preferably three individual scanners 16, 17, 18 is provided, whose first individual scanner 16 reads the possible code on the sliding surface of a conveyed individually packaged product through the light-transparent section 10, and whose other individual scanners 17, 18 read possible codes of other side surfaces of the conveyed individually packaged product, but it [first individual scanner] does not read the side surface of the individually packaged product that lies on the individually packaged product-conveying element 5 in a nonsliding manner.

Each of the two conveying sections has a (first or second) scanning device 15 each with preferably three individual scanners 16, 17, 18 as well as a (first or second) light-transparent section 10 or a (first or second) glass window, whereby an individual scanner 16 of the second conveying section reads a possible code of the up to now unread side surface of the individually packaged product that was lying beforehand in a nonsliding manner on the individually packaged product-conveying element 5 of the first conveying section through the associated second light-transparent section 10.

Figure 5:
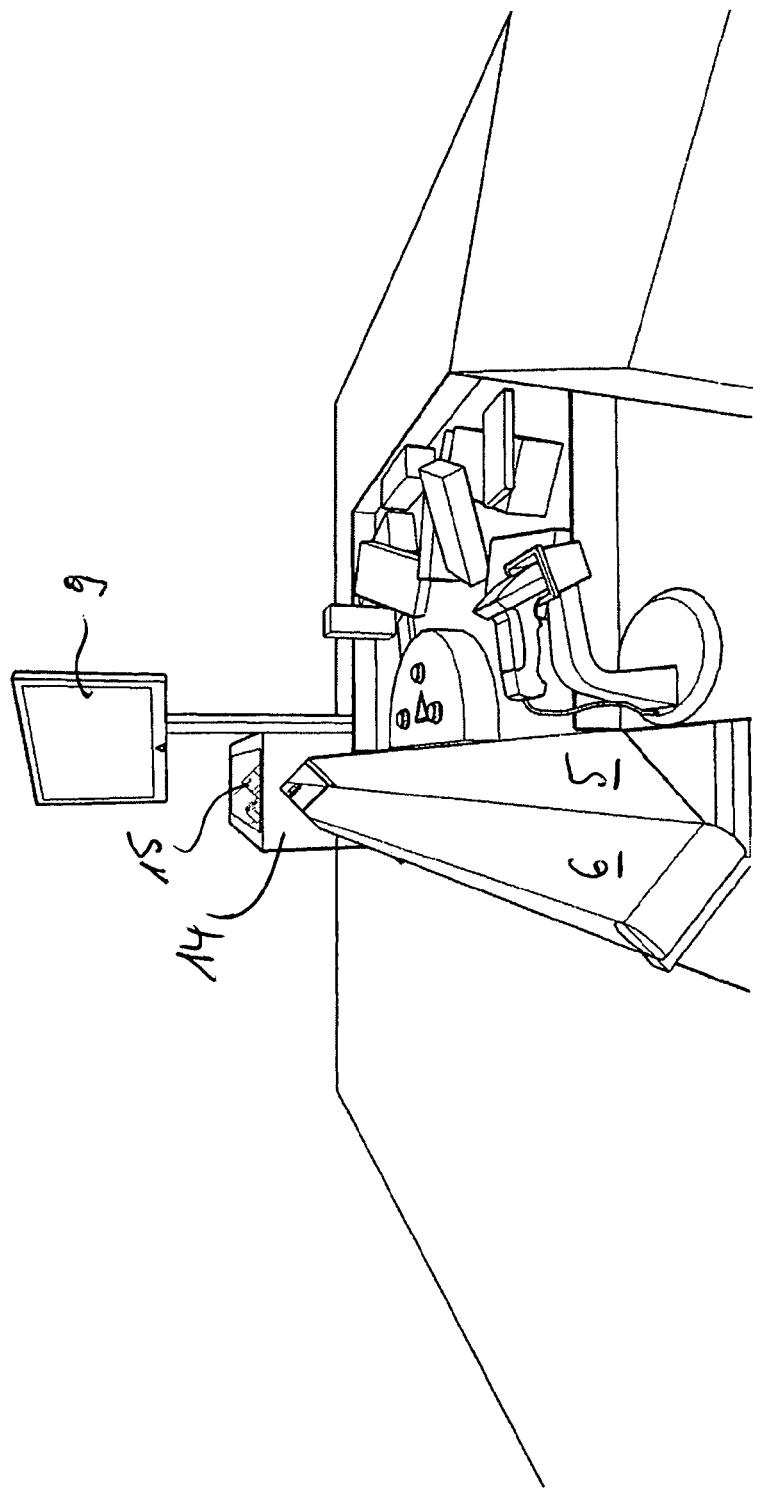
FIG. 5 is a perspective view showing a comparison device similar to FIG. 3 with a scanning tunnel.

The scanning devices 15 are optionally arranged in a scanning tunnel 14 according to FIG. 5.

A selecting means 13 for a lateral or lower ejection of individually packaged products 2' which are not recognized by the scanning device 15 or which are to be sorted out is provided in the area of the longitudinal end of the first conveying track 3.

Ejected, non-recognized individually packaged products 2' can be returned on a second conveying track 19 for a manual scanning by means of a hand scanner 7 and optionally for sorting out in the area of the inlet of the first conveying track 3 and can optionally be received in a container kept ready.

A container 12 that is empty or filled with hand-scanned individually packaged products on a third conveying track 20 can be conveyed from the area of the inlet of the first conveying track 3 under the longitudinal end of the first conveying track into a ready position.

Individually packaged products recognized by the scanning device 15 at the longitudinal end of the first conveying track 3 are delivered into the container 12 kept ready.

A buffer 23 with a flap that can be opened on the bottom for a guided delivery of buffered, scanned individually packaged products 2 into the container 12 kept ready is provided at the longitudinal end of the first conveying track 3.

The selecting means 13, which can be controlled by means of the central computer, has at least one transverse pusher, at least one diverter or at least one pivoting flap 21, which releases an ejection opening.

Figure 6:
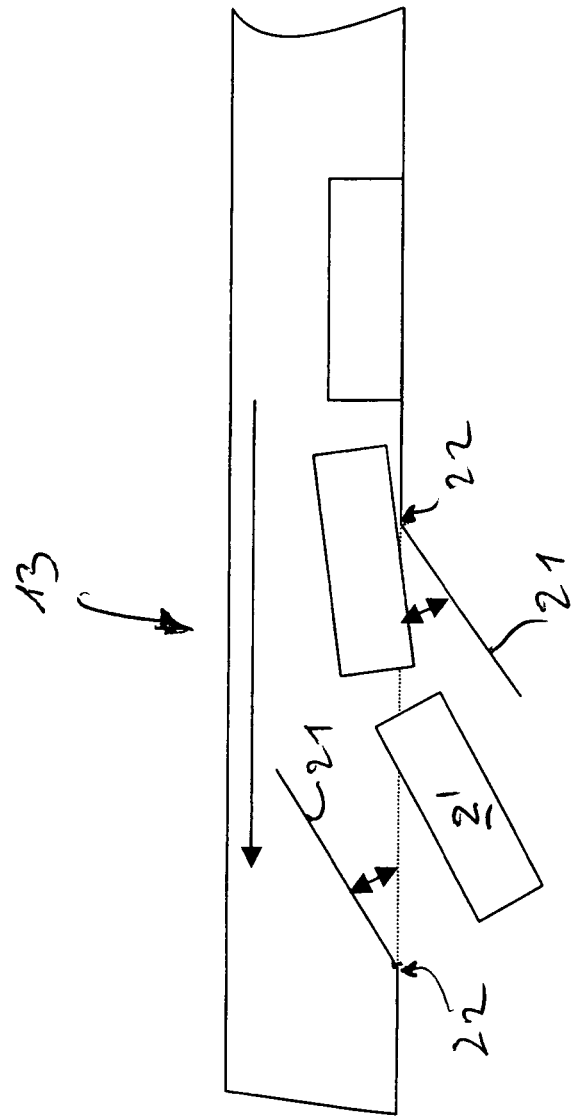
FIG. 6 is a schematic top view of the device according to FIG. 1 in the area of the selecting means.

The pivoting flap 21 may be designed as a counter-controlled double flap with two pivot axes 22 according to FIG. 6.

The terminal comprises a keyboard 8, a display screen 9 and a bidirectional wired connection to the individual scanners 16, 17, 18 of the scanning devices 15 as well as to the hand scanner 7 for a connection to the central computer for recognizing the desired data or identifying the individually packaged products, especially the individually packaged products of a complete commissioning order, as well as for comparing the actual data with the desired data of the individually packaged product quantity.

Furthermore, a spacer is provided for a simultaneous manual entry of two individually packaged products 2 that are spaced apart from one another on the first conveying track 3. In the exemplary embodiment of the drawings, the spacer is the keyboard 8 of the terminal, as this can be seen in FIGS. 1 through 3, for example.

A feed table 4 is located on the inlet side for the individually packaged products 2 approximately at the level of the inlet of the first conveying track 3.

Finally, a (not shown) distance light barrier is provided for the purpose of automatic turning off of the drive of the individually packaged product-conveying element 5 in case of undershooting a minimum distance of two individually packaged products to be scanned consecutively. Similar to the first individual scanner 16 behind the glass window, the distance light barrier is located behind the individually packaged product-sliding element 6 or sliding plate and recognizes an individually packaged product conveyed past through an opening in the sliding plate, and especially its length, as well as the distance between two conveyed individually packaged products by means of measuring time. The (minimum) distance between two conveyed individually packaged products, which it is essential to check, is obtained based on the known conveying speed of the first conveying track 3. If the minimum distance is undershot, the individually packaged product-conveying element 5 or the circular belt stops automatically. An operator then repositions the individually packaged products that are placed too close to one another on the first conveying track 3 and restarts the circular belt by pressing a button on the keyboard 8.

During operation, the individually packaged products 2 of a commissioning order are then placed or dumped out by an operator 24 from a container 12 containing the individually packaged products of the commissioning order onto the feed table 4 arranged upstream of the first conveying track 3 and fed to the first conveying track 3 separately, in particular, simultaneously, in pairs and spaced apart from one another. The operator 24 pulls an individually packaged product with both hands to the body into the V belt. The individually packaged products are taken over by the V belt and fed aligned to the scanning area. Two consecutive individually packaged products spaced apart from one another can be scanned simultaneously. Scanned and hereby recognized individually packaged products reach the longitudinal end of the first conveying track 3 and from there the buffer 23 or collecting hopper.

Before dumping out or placing the individually packaged products onto the feed table 4, however, bulky, heavy, sensitive, awkward and/or round individually packaged products are separated out from the container 12 or from the feed table 4 by the operator 24 and are identified in a hand scanner 7 or by entering the actual data on the keyboard 8 of a terminal of the central computer and the identified individually packaged products are subsequently placed back in the container again.

The container 12 is placed on the third conveying track 20 and is then conveyed from there under the outlet of the first conveying track 3 into a ready position, which then takes over the scanned and recognized individually packaged products 2 of the buffer 23.

Scanned and not recognized individually packaged products 2' are separated out by the selecting means 13 and then returned into the area of the start of the first conveying track 3 via the second conveying track 11.

The returned individually packaged products 2' are identified by the operator 24 by means of the hand scanner 7 or by entering the actual data on the keyboard 8 of the central computer.

Hereby recognized individually packaged products of the commissioning order are again guided via the first conveying track 3 to the container 12 under the outlet of the first conveying track 3.

Not recognized individually packaged products are transferred to a place for separating out or are fed back into a commissioning warehouse.

The individually packaged product is acoustically or visually identifiable to an operator 24 at least when the desired data are in agreement with the actual data.

Also, a recognition report is prepared about a correct commissioning order.

A report about an error in commissioning may likewise be prepared.

The present invention pertains especially to the device 1 according to FIG. 8, in which the "check station" according to the schematic diagram according to FIG. 7 is converted into a filling station for individual orders. In this case, especially a plurality of selecting means 13 arranged one behind the other are then used for a lateral or lower ejection of individually packaged products, recognized by the scanning devices 15, into assigned single-order containers 25, while the longitudinal end of the first conveying track 3 is used as an ejection of non-recognized individually packaged products in container 26.

The conveying track 3 and scanning process as well as the operation of the device 1 according to FIG. 8 are identical to the embodiment variants according to FIGS. 1 through 7.

In particular, at least two selecting means 13, which can be controlled by the central computer, are provided in the area of the longitudinal end of the first conveying track 3 for a lateral ejection of individually packaged products recognized by the scanning device 15, whereby each of the selecting means 13 fills a positioned order container 25 of a certain commissioning order with individually packaged products of the certain commissioning order, and individually packaged products which are not recognized or are to be sorted out are delivered at the longitudinal end of the first conveyor track 3.

In each selecting means 13, a buffer with a flap that can be opened on the bottom for a guided delivery of buffered, recognized individually packaged products 2 into a positioned order container 25 may be provided at the lateral delivery point.

Likewise, a buffer 23 with a flap that can be opened on the bottom for a guided delivery of buffered, non-recognized individually packaged products 2 into a container 26 kept ready may be located at the longitudinal end of the first conveying track 3.

During operation, the individually packaged products 2 of a plurality of commissioning orders are preferably simultaneously delivered in chaotic distribution onto a central belt 27 of an automatic commissioning unit of the commissioning unit and conveyed via a central belt 27 and optionally joining conveying belts to a distribution station A, and especially a shipping station.

In the distribution station A, the individually packaged products are grasped by an operator 24 from the central belt 27 or from an accumulation place arranged downstream of the central belt and fed in pairs and spaced apart from one another simultaneously to the inlet of the first conveying track 3, as this is also the case in the variants according to FIGS. 1 through 7.

In order to be able to process greater chaotically distributed quantities of individually packaged products from the central belt 27 faster, two operators 24 may optionally be provided, who operate only one central belt 27 in the distribution station A by means of two parallel devices 1 with central positioning of identical order containers 25, which are arranged in the extension of the end of the central belt 27. Central belt 27 and device 1 are not arranged at a right angle to one another here, as this is shown in the exemplary embodiment according to FIG. 8, but rather both devices 1 spaced apart from one another (which, however, only have the order containers 25 once) run parallel to and laterally offset from the central belt 27.

An order container 25 of a complete commissioning order filled with individually packaged products is fed or transported to a truck loading station or a parking station.

By means of the present invention, a large number of unsorted individually packaged products not fed in containers or products of a plurality of commissioning orders can be recognized in a simple manner, very reliably and very quickly by means of the device 1 in a simple ergonomic operation optionally according to variants according to FIGS. 1 through 7, and the commissioning orders according to variants according to FIGS. 1 through 7 can be checked, and a plurality of commissioning orders according to FIG. 8 can be combined. Atypical individually packaged products are handscanned.

While specific embodiments of the invention have been described in detail to illustrate the application of the principles of the invention, it will be understood that the invention may be embodied otherwise without departing from such principles.

The invention claimed is:

1. A device for recognizing and guiding individually packaged products provided with a code in a commissioning unit, the device comprising:
   a conveying track with a V-shaped cross section;
   a scanning device with a plurality of individual scanners;
   a central computer, whereby the individually packaged products are guided separated and centered on the conveying track that has the V-shaped cross section through the scanning device with the plurality of individual scanners and are identified in the scanning device by reading the code of the individually packaged product as actual data and are compared or detected with the desired data, stored in the central computer, and if there is disagreement of the desired data with the actual data, the individually packaged product is separated out, wherein the conveying track, which has a V-shaped cross section, has one V leg that is a driven individually packaged product-conveying element comprising a driven circular conveying belt, on which the conveyed individually packaged product lies in a nonsliding manner, and has another V leg that is a stationary individually packaged product-sliding element comprising a sliding plate, on which the conveyed individually packaged product slides; and
   at least two selecting means controlled by the central computer, said selecting means being provided in an area of a longitudinal end of the conveying track for a lateral ejection of individually packaged products recognized by the scanning device, whereby each of the selecting means fills a positioned order container of a certain commissioning order with individually packaged products of the certain commissioning order, and individually packaged products which are not recognized or are to be sorted out are delivered at the longitudinal end of the conveyor track.

2. A device in accordance with claim 1, wherein in each selecting means, a buffer with a flap that can be opened on the bottom for a guided delivery of buffered, recognized individually packaged products into a positioned order container is provided at a lateral delivery point.

3. A device in accordance with claim 1, further comprising a buffer with a flap that can be opened on the bottom for a guided delivery of buffered, non-recognized individually packaged products into a container kept ready is provided at the longitudinal end of the conveying track.

4. A device in accordance with claim 1, wherein the selecting means has at least one transverse pusher, at least one diverter or at least one pivoting flap, which releases an ejection opening.

5. A device in accordance with claim 4, wherein the pivoting flap is a counter-controlled double flap with two pivot axes.

6. A device in accordance with claim 1, wherein the conveying track is arranged horizontally.

7. A device in accordance with claim 1, wherein the two V legs of the conveying track form an angle of at least 90°.

8. A device in accordance with claim 1, wherein at least one of the V legs forms or form an angle to 45° to the horizontal.

9. A device in accordance with claim 1, wherein in the longitudinal direction, the conveying track is composed of first and second conveying sections aligned with one another, each comprising said individually packaged product-conveying element and said individually packaged product-sliding element, whereby the individually packaged product-sliding element of the second conveying section is connected, aligned, to the individually packaged product-conveying element of the first conveying section, and inversely, the individually packaged product-conveying element of the second conveying section is connected, aligned, to the individually packaged product-sliding element of the first conveying section.

10. A device in accordance with claim 9, wherein each of the first and second conveying sections has one of a first scanning device and a second scanning device, each with three individual scanners as well as a first or second light-transparent section, whereby an individual scanner of the second conveying section reads a possible code of the up to now unread side surface of the individually packaged product that was lying beforehand in a nonsliding manner on the individually packaged product-conveying element of the first conveying section through the associated second light-transparent section.

11. A device in accordance with claim 1, further comprising a stationary light-transparent section arranged directly downstream aligned with the non-light-transparent individually packaged product-sliding element, whereby the length of the individually packaged product-conveying element corresponds approximately to the sum of the individual lengths of the individually packaged product-sliding element and of the light-transparent section.

12. A device in accordance with claim 1, wherein in the area of the light-transparent section, the scanning device is provided as a three-dimensional scanning device with three individual scanners including a first individual scanner that reads the possible code on the sliding surface of a conveyed individually packaged product through the light-transparent section, and other individual scanners that read possible codes of other side surfaces of the conveyed individually packaged product, but do not read the side surface of the individually packaged product that lies in a nonsliding manner on the individually packaged product-conveying element.

13. A device in accordance with claim 1, wherein the scanning device is arranged in a scanning tunnel.

14. A device in accordance with claim 1, wherein a distance recognition means for automatic turning off of a drive of the individually packaged product-conveying element in case of undershooting a minimum distance of two individually packaged products to be scanned consecutively.

15. A device for recognizing and guiding individually packaged products provided with a code in a commissioning unit, the device comprising:
   a conveying track with a V-shaped cross section;
   a scanning device with a plurality of individual scanners;
   a central computer, whereby the individually packaged products are guided separated and centered on the conveying track that has the V-shaped cross section through the scanning device with the plurality of individual scanners and are identified in the scanning device by reading the code of the individually packaged product as actual data and are compared or detected with the desired data, stored in the central computer, and if there is disagreement of the desired data with the actual data, the individually packaged product is separated out;
   at least two selecting means controlled by the central computer, said selecting means being provided in an area of a longitudinal end of the conveying track for a lateral ejection of individually packaged products recognized by the scanning device, whereby each of the selecting means fills a positioned order container of a certain commissioning order with individually packaged products of the certain commissioning order, and individually packaged products which are not recognized or are to be sorted out are delivered at the longitudinal end of the conveyor track; and
   a buffer with a flap that can be opened on the bottom for a guided delivery of buffered, non-recognized individually packaged products into a container kept ready is provided at the longitudinal end of the conveying track.

16. A device for recognizing and guiding individually packaged products provided with a code in a commissioning unit, the device comprising:
   a conveying track with a V-shaped cross section, wherein in the longitudinal direction, the conveying track is composed of first and second conveying sections aligned with one another, each comprising an individually packaged product-conveying element and an individually packaged product-sliding element, whereby the individually packaged product-sliding element of the second conveying section is connected, aligned, to the individually packaged product-conveying element of the first conveying section, and inversely, the individually packaged product-conveying element of the second conveying section is connected, aligned, to the individually packaged product-sliding element of the first conveying section;
   a scanning device with a plurality of individual scanners;
   a central computer, whereby the individually packaged products are guided separated and centered on the conveying track that has the V-shaped cross section through the scanning device with the plurality of individual scanners and are identified in the scanning device by reading the code of the individually packaged product as actual data and are compared or detected with the desired data, stored in the central computer, and if there is disagreement of the desired data with the actual data, the individually packaged product is separated out; and
   at least two selecting means controlled by the central computer, said selecting means being provided in an area of a longitudinal end of the conveying track for a lateral ejection of individually packaged products recognized by the scanning device, whereby each of the selecting means fills a positioned order container of a certain commissioning order with individually packaged products of the certain commissioning order, and individually packaged products which are not recognized or are to be sorted out are delivered at the longitudinal end of the conveyor track.

\* \* \* \* \*